United States Patent
Weber et al.

[11] Patent Number: 5,969,016
[45] Date of Patent: *Oct. 19, 1999

[54] MOLDED MATERIALS BASED ON POLYCARBONATES

[75] Inventors: Martin Weber, Neustadt; Robert Weiss, Kirchheim; Norbert Güntherberg, Speyer; Klemens Massonne, Westheim; Joachim Seibring, Freinsheim; Guenther Zimmer, Mainz, all of Germany

[73] Assignee: BASF Aktiengesellschaft, Ludwigshafen, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 08/772,127

[22] Filed: Dec. 20, 1996

[30] Foreign Application Priority Data

Dec. 21, 1995 [DE] Germany ............. 19547884

[51] Int. Cl.[6] ............. C08L 69/00; C08L 25/12; C08L 55/02
[52] U.S. Cl. ............. 524/127; 524/141; 524/375; 525/67; 525/462
[58] Field of Search ............. 525/67, 462; 524/127, 524/141, 373, 375

[56] References Cited

U.S. PATENT DOCUMENTS

| | | | |
|---|---|---|---|
| 3,535,280 | 10/1970 | Schnell et al. | 260/47 |
| 3,737,409 | 6/1973 | Fox. | |
| 4,532,288 | 7/1985 | Robeson | 524/375 |
| 4,548,987 | 10/1985 | Bauer et al. | 525/67 |
| 4,692,488 | 9/1987 | Kress | 524/141 |
| 5,250,590 | 10/1993 | Nakai | 524/373 |
| 5,350,802 | 9/1994 | Muskopf | 525/67 |
| 5,393,835 | 2/1995 | Eckel et al. | 525/67 |
| 5,585,193 | 12/1996 | Josephy | 428/515 |

FOREIGN PATENT DOCUMENTS

| | | |
|---|---|---|
| 439138 | 7/1991 | European Pat. Off. . |
| 483 917 | 5/1992 | European Pat. Off. . |
| 538 950 | 4/1993 | European Pat. Off. . |
| 572919 | 12/1993 | European Pat. Off. . |
| 300266 | 8/1915 | Germany . |
| 4211061 | 10/1993 | Germany . |
| 065251 | 5/1980 | Japan . |
| 302025 | 11/1993 | Japan . |

OTHER PUBLICATIONS

*Chem. Abst.*, vol. 91, No. 12, Sep. 17, 1979, AN 92531 (ZA 7802445, Mar. 15, 1979).
Chen et al., *J. Appl. Polym. Sci.*, 1994, 51, pp. 955–965.
Scholtan et al., *Kolloid–Z. und Z.–Polymere*, 250, 1972, pp. 782–796.

*Primary Examiner*—David Buttner
*Attorney, Agent, or Firm*—Keil & Weinkauf

[57] ABSTRACT

Molding materials contain

A) from 5 to 97.9% by weight of at least one polycarbonate having a weight average molecular weight ($M_w$) of from 10,000 to 64,000 g/mol, B) from 1 to 93.9% by weight of at least one graft copolymer, C) from 1 to 93.9% by weight of at least one copolymer $c_1$) at least one vinylaromatic compound of the general formula I

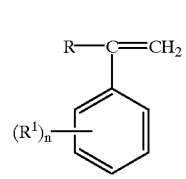

(I)

where R is hydrogen or $C_1$–$C_8$-alkyl, $R^1$ is $C_1$–$C_8$-alkyl and n is an integer from 0 to 3, or of a $C_1$–$C_8$-alkyl acrylate, a $C_1$–$C_8$-alkyl $C_1$–$C_8$-alkylacrylate or a mixture thereof and $c_2$) acrylonitrile, $C_1$–$C_8$-alkylacrylonitrile or a mixture thereof, D) from 0.01 to 10% by weight of at least one polyhydroxyether of at least one aliphatic or aromatic diol with epihalohydrin, E) from 1 to 25% by weight of at least one halogen-free phosphorus compound and F) from 0 to 50% by weight of additives.

15 Claims, No Drawings

MOLDED MATERIALS BASED ON POLYCARBONATES

The present invention relates to molding materials which contain

A) from 5 to 97.9% by weight of at least one polycarbonate having a weight average molecular weight ($M_w$) of from 10,000 to 64,000 g/mol, B) from 1 to 93.9% by weight of at least one graft copolymer, C) from 1 to 93.9% by weight of at least one copolymer of $C_1$) at least one vinylaromatic compound of the general formula I

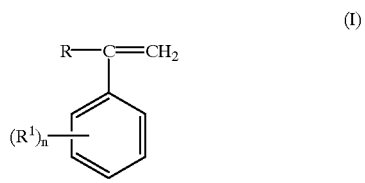

where R is hydrogen or $C_1$–$C_8$-alkyl, $R^1$ is $C_1$–$C_8$-alkyl and n is an integer from 0 to 3, or of a $C_1$–$C_8$-alkyl acrylate, a $C_1$–$C_8$-alkyl $C_1$–$C_8$-alkylacrylate or a mixture thereof and $c_2$) acrylonitrile, $C_1$–$C_8$-alkylacrylonitrile or a mixture thereof, D) from 0.01 to 10% by weight of at least one polyhydroxyether of at least one aliphatic or aromatic diol with epihalohydrin, E) from 0 to 25% by weight of at least one halogen-free phosphorus compound and F) from 0 to 50% by weight of additives.

The present invention furthermore relates to the use of these molding materials for the production of moldings, films or fibers and to the moldings, films or fibers which are obtainable from these molding materials. The present invention also relates to the use of polyhydroxyethers D as assistance for flameproofing agents based on halogen-free phosphorus compounds and to such flameproofing agents.

Blends which contain polycarbonates, graft copolymers, in particular ABS or ASA, and copolymers based on styrene are used for many applications, for example in the automotive sector or in the household or sports sector.

Such molding materials often do not have sufficient flowability for the production of thin-walled shaped articles or, if they have sufficient flowability, they lack heat distortion resistance. According to EP-A 570 797, the flowability of such molding materials can be improved without adversely affecting the heat distortion resistance when a blend of polycarbonates of different viscosity is used. The molding materials described in EP-A 570 797 have the disadvantage that they are generally not sufficiently tough at low temperatures.

Furthermore, the production of flame-retardant molding materials represents problems. Phosphorus compounds as a mixture with an assistant are frequently used as flameproofing agents. EP-A-538 950 discloses a mixture of novolak or polyphenylene ether, poly-p-hydroxystyrene and a phosphorus compound as flameproofing agent. However, moldings obtained from these blends crack even under low impact.

It was known that polyhydroxyethers obtained from bisphenol A and epichlorohydrin are immiscible and incompatible with ABS. Only when the polyhydroxy ethers react with styrene/acrylonitrileglycidyl methacrylate and form a copolymer do the morphology for the blends become finer and the mechanical properties improve (cf Chen et al., J. Appl. Polym. Sci. 1994, 51, 955).

Thus, polymers which contain OH groups and react with polyamides also act as compatibilizers in blends of polycarbonates, polyamides, graft copolymers and copolymers.

If OH-containing polymers are used in blends which, in addition to polycarbonates and graft copolymers, contain copolymers which have anhydride or imido groups, according to EP-A 483 917 molding materials having good heat distortion resistance and good impact strength are obtained. However, these molding materials are too brittle for many applications. This is evident in particular under impact.

It is an object of the present invention to provide molding materials which are based on polycarbonates, graft copolymers and copolymers and, in addition to good heat distortion resistance and good impact strength, have very little tendency to crack under impact. It is also intended to provide molding materials which are readily processible and are flame-retardant.

Component A

According to the invention, the molding materials contain, as component A, from 5 to 97.9% by weight, based on the sum of the components A to F, of at least one polycarbonate having a weight average molecular weight ($M_w$, determined by means of gel permeation chromatography in tetrahydrofuran against polystyrene standards) of from 10,000 to 60,000 g/mol. Preferred novel molding materials contain from 7.5 to 94.5% by weight, based on the sum of components A to F, of component A. In particularly preferred novel molding materials, the polycarbonates A are present in amounts of from 10 to 91.9% by weight, based on the sum of the components A to F.

Suitable polycarbonates A are known per se. They are obtainable, for example, by interfacial polycondensation by processes similar to those of DE-B-300 266 or by reacting diphenyl carbonate with bisphenols by the process of DE-A-1 495 730. A preferred bisphenol is 2,2-di(4-hydroxyphenyl)propane, referred to in general—as also below—as bisphenol A.

Instead of bisphenol A, other aromatic dihydroxy compounds may also be used, in particular 2,2-di(4-hydroxyphenyl)pentane, 2,6-dihydroxynaphthalene, 4,4'-dihydroxydiphenyl sulfone, 4,4'-dihydroxydiphenyl ether, 4,4'-dihydroxydiphenyl sulfite, 4,4'-dihydroxydiphenylmethane, 1,1-di-(4-hydroxyphenyl) ethane, 4,4'-dihydroxydiphenyl or dihydroxydiphenylcycloalkanes, preferably dihydroxydiphenylcyclohexanes or dihydroxycyclopentanes, in particular 1,1-bis-(4-hydroxyphenyl)-3,3,5-trimethylcyclohexane, and mixtures of the abovementioned dihydroxy compounds.

Particularly preferred polycarbonates are those based on bisphenol A or bisphenol A together with up to 80 mol % of the abovementioned aromatic dihydroxy compounds.

Copolycarbonates according to U.S. Pat. No. 3,737,409 may also be used; of particular interest are copolycarbonates based on bisphenol A and di-(3,5-dimethyldihydroxyphenyl) sulfone, which possess high heat distortion resistance. Mixtures of different polycarbonates may also be used.

The weight average molecular weights ($M_w$, determined by means of gel permeation chromatography in tetrahydrofuran against polystyrene standards) of the polycarbonates A are, according to the invention, from 10,000 to 64,000 g/mol. They are preferably from 15,000 to 63,000, in particular from 15,000 to 60,000, g/mol. This means that the polycarbonates A have relative solution viscosities of from 1.1 to 1.3, preferably from 1.15 to 1.33, measured in 0.5% strength by weight solution in dichloromethane at 25° C. Preferably, the relative solution viscosities of the polycarbonates used differ by not more than 0.05, in particular not more than 0.04.

According to the invention, the component A may also be a mixture of polycarbonates and polycarbonates from extrusion wastes, provided that their weight average molecular weight ($M_w$, determined by means of gel permeation chromatography in tetrahydrofuran against polystyrene standards) is likewise from 10,000 to 64,000 g/mol. In general, the polycarbonates from extrusion wastes differ from polycarbonates produced for the first time in that they have a slightly lower molecular weight. However, the statement made above is applicable to the difference between the relative solution viscosities when polycarbonates and polycarbonates from extrusion wastes are used.

Preferred mixtures contain from 5 to 100, in particular from 10 to 90% by weight, based on $a_1$ and $a_2$, of at least one polycarbonate ($a_1$) and from 0 to 95, in particular from 10 to 90% by weight, based on $a_1$ and $a_2$, of at least one polycarbonate from extrusion wastes ($a_2$).

The polycarbonates A may be used either as milled material or in granulated form.

Component B

The novel molding materials contain from 1 to 93.9% by weight of graft copolymers B as a further component. Preferred molding materials contain from 2.5 to 89.5, in particular from 3 to 86.9%, by weight of component B. The stated percentages by weight are based in each case on the sum of components A to F.

In general, a very wide range of graft copolymers may be used, but graft copolymers whose grafting base $b_1$ consists of an elastomeric core having a glass transition temperature of less than 10° C., preferably less than 0° C., in particular −10° C., are preferred.

These are, for example, natural rubber, synthetic rubber based on conjugated dienes or elastomers based on $C_1$–$C_{18}$-alkyl esters of acrylic acid, which may also contain further comonomers.

Preferred grafting bases $b_1$ are polybutadiene and copolymers of polybutadiene and styrene.

Grafting bases $b_1$ which are composed of $b_{11}$) from 70 to 99.9, preferably from 90 to 99%, by weight of at least one alkyl acrylate where the alkyl radical is of 1 to 8 carbon atoms, preferably n-butyl acrylate and/or 2-ethylhexyl acrylate, in particular n-butyl acrylate as the sole alkyl acrylate, $b_{12}$) from 0 to 30, in particular from 20 to 30%, by weight of a further copolymerizable monoethylenically unsaturated monomer, such as butadiene, isoprene, styrene, acrylonitrile, methyl methacrylate and/or vinylmethyl ether, and $b_{13}$) from 0.1 to 5, preferably from 1 to 4%, by weight of a copolymerizable, polyfunctional, preferably bifunctional or trifunctional, monomer which effects crosslinking are also preferred.

Suitable bifunctional or polyfunctional crosslinking monomers $b_{13}$ of this type are monomers which preferably contain two, if required also three or more, ethylenic double bonds which are capable of copolymerization and are not conjugated in the 1,3 positions. Examples of suitable crosslinking monomers are divinylbenzene, diallyl maleate, diallyl fumarate, diallyl phthalate, triallyl cyanurate and triallyl isocyanate. A particularly preferred crosslinking monomer is dihydrodicyclopentadienyl acrylate:

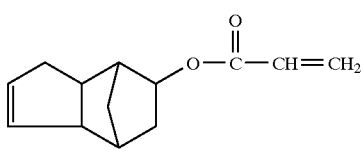

(II)

Methacryloylalkyloxysilanes of the general formula III

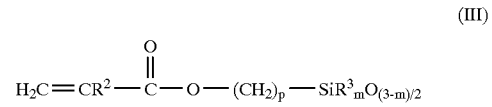

(III)

where $R^2$ is hydrogen or methyl, $R^3$ is $C_1$–$C_3$-alkyl or phenyl, preferably methyl, m is an integer from 0 to 2 and p is an integer from 1 to 6, preferably from 1 to 4, are also suitable.

The graft $b_2$ may have a one-stage or multistage composition. In general, it has a one-stage or two-stage composition.

Preferably, the first graft $b_{21}$ is prepared from vinylaromatic compounds of the general formula I

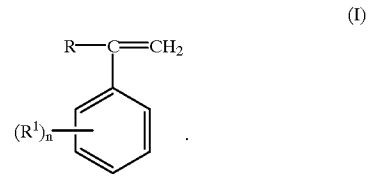

(I)

In this formula, R may be hydrogen or $C_1$–$C_8$-alkyl, preferably $C_1$–$C_3$-alkyl, in particular methyl. Independently of R, $R^1$ is $C_1$–$C_8$-alkyl, among which $C_1$–$C_3$-alkyl is preferred. $R^1$ is particularly preferably methyl.

n is an integer from 0 to 3, preferably either 0 or 1. Very particularly preferably, $b_{21}$ is styrene or α-methylstyrene.

Furthermore, the first graft $b_{21}$ may be composed of a $C_1$–$C_8$-alkyl acrylate, preferably a $C_1$–$C_4$-alkyl acrylate, in particular methyl acrylate. It is also possible for $b_{21}$ to be composed of a $C_1$–$C_8$-alkyl $C_1$–$C_8$-alkylacrylate, preferably $C_1$–$C_4$-alkyl $C_1$–$C_4$-alkylacrylate, in particular methyl methacrylate. Mixtures of different monomers can of course also be used.

The second graft $b_{22}$ is preferably composed of acrylonitrile, $C_1$–$C_8$-alkylacrylonitrile, preferably $C_1$–$C_4$-alkylnitrile, in particular methacrylonitrile, or $C_1$–$C_8$-alkyl $C_1$–$C_8$-alkylacrylate. Among the alkyl alkylacrylates, the $C_1$–$C_4$-alkyl $C_1$–$C_4$-alkylacrylates are preferred, in particular methyl methacrylate. Mixtures of different monomers may of course also be used for synthesizing $b_{22}$.

In general, the preferred graft copolymers B are composed of from 40 to 80% by weight of a grafting base $b_1$ and from 20 to 60% by weight of a graft $b_2$. The preferred grafts are generally composed of from 50 to 95% by weight of $b_{21}$ and from 5 to 50% by weight of $b_{22}$.

If the grafting base $b_1$ is essentially composed of butadiene polymers, the term ABS rubbers is used. If the grafting base is based on acrylate polymers, the graft copolymers are called ASA rubbers.

Either the preparation of the graft copolymers B is known or they can be prepared by methods known per se. Thus, the graft copolymerization can be carried out in solution, suspension or, preferably, emulsion. The graft copolymerization is particularly preferably carried out in aqueous emulsion.

Emulsifiers, such as alkali metal salts of alkanesulfonic or alkylarylsulfonic acids, alkylsulfates, fatty alcohol sulfonates, salts of higher fatty acids of from 10 to 30 carbon atoms or resin salts, may be used for the preparation in aqueous emulsion. Sodium salts of alkanesulfonates or of fatty acids of from 10 to 18 carbon atoms are preferably used. Emulsifiers are preferably used in amounts of from 0.3 to 5, in particular from 1 to 2%, by weight, based on the total weight of the monomers forming the graft copolymers B. In particular, persulfates, such as potassium peroxodisulfate, are used as polymerization initiators; however, redox systems, which permit lower polymerization temperatures, are also suitable. The amount of initiators (for example from 0.1 to 1% by weight, based on the total weight of the monomers used for the preparation of the grafting base $b_1$) depends in a known manner on the desired molecular weight.

Buffer substances, by means of which the pH is brought to, preferably, from 6 to 9, for example sodium bicarbonate or sodium pyrophosphate, and molecular weight regulators, such as mercaptans, terpinols or dimeric α-methylstyrene, may be used as polymerization assistants. The molecular weight regulators are generally used in amounts of up to 3% by weight, based on the total weight of the monomers used for the preparation of the grafting base $b_1$.

For the preparation of the grafting base $b_1$, a crosslinked seed latex is generally first produced. In general, the seed latex has an average particle size $d_{50}$ of from 20 to 150 nm, preferably from 50 to 100 nm. The seed latex is then reacted with further monomers, crosslinking agents, emulsifiers, polymerization assistants and initiators to give the grafting base $b_1$.

The graft copolymerization of the monomers forming the graft $b_2$ onto the grafting base $b_1$ is once again advantageously carried out is in aqueous emulsion.

As a rule, the preparation of the graft $b_2$ is carried out in the same system as the polymerization of the grafting base $b_1$, and a further emulsifier and initiator may be added. These may, but need not, be identical to the emulsifiers and initiators used for the preparation of $b_1$. The emulsifier, initiator and polymerization assistants may each be initially taken either alone or as a mixture together with the emulsion of the grafting base $b_1$. However, they may also be added, either alone or as a mixture together with the monomers used for the grafts, to the emulsion of $b_1$.

As stated above, the grafting of the grafting base with the monomers forming the respective grafts can be carried out in one or more stages. Thus, the monomers of the respective graft can be added all at once, batchwise in a plurality of stages or continuously to the grafting base or to the product of grafting base and preceding graft.

The graft copolymers B have, as a rule, particle diameters of from 50 to 700 nm, preferably from 200 to 500 nm. The particle diameters are understood as meaning the $d_{50}$ value of the integral mass distribution.

Mixtures of graft copolymers having different particle sizes may also be used as component B. In a preferred embodiment, a mixture of two craft copolymers having particle diameters ($d_{50}$-value of the integral mass distribution) of from 50 to 180 nm and from 200 to 700 nm in a weight ratio of from 70:30 to 30:70 is used.

The chemical compositions of the two graft copolymers of this embodiment are preferably identical, although the graft of the coarse-particle graft copolymer preferably has a two-stage composition.

Component C

The novel molding materials contain, as component C, from 1 to 93.9, preferably from 2.5 to 89.5%, by weight, based on the sum of components A to F, of at least one copolymer.

Particularly preferred novel molding materials contain from 3 to 86.9% by weight, based on the sum of the components A to F, of component C.

According to the invention, the copolymers C are composed of at least one vinylaromatic compound, at least one alkyl acrylate or alkyl alkylacrylate or a mixture thereof (component $c_1$).

The vinylaromatic compound has the general formula I

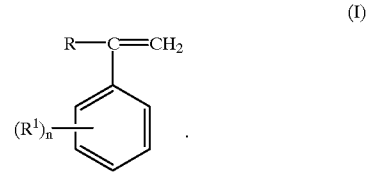

In this formula, R is hydrogen or $C_1$–$C_8$-alkyl, among which $C_1$–$C_4$-alkyl is preferred. R is particularly preferably hydrogen or methyl. Independently of R, $R^1$ is $C_1$–$C_8$-alkyl, preferably $C_1$–$C_4$-alkyl, in particular methyl. n is an integer from zero to 3, preferably 0 or 1. According to the invention, the alkyl acrylates have an alkyl radical of from 1 to 8, preferably from 1 to 4 carbon atoms. Methyl acrylate is particularly preferably used. The alkyl alkylacrylates suitable as component $c_1$ are $C_1$–$C_8$-alkyl $C_1$–$C_8$-alkylacrylate. Methyl methacrylate is particularly preferably used.

The comonomers $c_2$ forming the component C are acrylonitrile or $C_1$–$C_8$-alkylacrylonitrile, preferably $C_1$–$C_4$-alkylacrylonitrile, or mixtures thereof. Preferred comonomers $c_2$ are acrylonitrile or methacrylonitrile or mixtures thereof.

Component C is preferably composed of from 50 to 95, in particular from 60 to 80%, by weight of $c_1$ and accordingly from 5 to 50, in particular from 20 to 40%, by weight of $c_2$.

Particularly preferred copolymers C are those comprising styrene with acrylonitrile, those comprising styrene with acrylonitrile and methyl acrylate, those comprising α-methylstyrene with acrylonitrile or those comprising α-methylstyrene with acrylonitrile and methyl methacrylate. A plurality of different copolymers C may also be simultaneously used.

The copolymers C are known per se or can be prepared by methods known per se. They can be prepared, for example, by free radical polymerization, in particular by emulsion, suspension, solution or mass polymerization. Such copolymers are also frequently formed as byproducts in the graft copolymerization for the preparation of component B, especially when large amounts of monomers are grafted onto small amounts of rubber.

The copolymers C have viscosity numbers of from 40 to 160. This corresponds to weight average molecular weights $M_w$ of from 40,000 to 2,000,000 g/mol.

Component D

The novel molding materials contain, as component D, from 0.01 to 10% by weight of at least one polyhydroxyether of at least one aliphatic or aromatic diol and an epihalohydrin. Preferred novel molding materials contain up to 8% by weight of component D. The component D is particularly preferably present in the novel molding materials in amounts of from 0.05 to 5, in particular from 0.1 to 3%, by weight. Very particularly preferred novel molding materials contain the component D in amounts of 1% by weight or less, for example in amounts of from 0.1 to 0.9% by weight. The abovementioned percentages by weight are each based on the sum of the components A to F.

The polyhydroxyethers which may be used as component D are condensates of aliphatic or aromatic diols with epihalohydrin. In the case of the aliphatic diols, diols of 2 to 10 carbon atoms, for example 1,2-propanediol, 1,3-propanediol, 1,4-butanediol, 2,4-pentanediol, 1,5-pentanediol, 1,2-hexanediol, 1,5-hexanediol or 1,6-hexanediol, are preferred. Among the aromatic diols, bisphenols are particularly suitable.

Bisphenol A (2,2-di(4-hydroxyphenyl)propane) is particularly preferably used. Instead of bisphenol A, however, it is also possible to use, for example, the bisphenols suitable for the preparation of polycarbonates as stated under A. The epihalohydrin used is in particular epichlorohydrin. Polyhydroxyethers of bisphenol A and epichlorohydrin are particularly preferred. In addition, polyhydroxyethers based on bisphenol S (di-4,4'-hydroxyphenyl sulfone) are among the particularly preferred components D.

The polyhydroxyethers have in general weight average molecular weights ($M_w$ determined by means of gel permeation chromatography in tetrahydrofuran against polystyrene standards) of from 10,000 to 150,000, preferably from 15,000 to 120,000 g/mol.

The polyhydroxyethers D are known per se or are obtainable by known processes.

Component E

The halogen-free phosphorus compounds which may be used as component E are present in the novel molding materials in amounts of from 0 to 25, preferably from 0 to 20%, by weight, based on the sum of components A to F. Particularly preferred novel molding materials contain from 2 to 15% by weight of at least one halogen-free phosphorus compound.

In general, a very wide range of halogen-free phosphorus compounds may be used. Preferred phosphorus compounds are those of the general formula IV

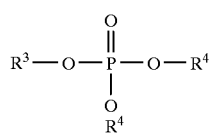

(IV)

where $R^3$, $R^4$ and $R^5$, independently of one another, are halogen-free $C_1$–$C_8$-alkyl or halogen-free $C_6$–$C_{20}$-aryl, which may be monosubstituted or disubstituted by $C_1$–$C_4$-alkyl.

Preferred compounds are those in which at least two of the radicals $R^3$, $R^4$ and $R^5$ are identical. The use of aromatic phosphates, in particular of phosphates of the general formula II, in which the radicals are phenyl and cresyl groups, which in turn may furthermore be monosubstituted or disubstituted, preferably by methyl, ethyl or isopropyl, is preferred.

Examples of particularly suitable phosphorus compounds of the general formula II are tri(2,6-dimethylphenyl) phosphate, triphenyl phosphate, tricresyl phosphate, diphenyl 2-ethylcresyl phosphate, diphenyl cresyl phosphate and tri(isopropylphenyl) phosphate.

Mixtures of the abovementioned phosphates with, for example, triphenylphosphine oxide or tri(2,6-dimethylphenyl) phosphine oxide may also be used.

Phosphates, such as bisphenyl 4-phenylphenyl phosphate, phenyl bis(4-phenylphenyl) phosphate, tris(4-phenylphenyl) phosphate, bisphenyl benzylphenyl phosphate, phenyl bis(benzylphenyl) phosphate, tris(benzylphenyl) phosphate, phenyl bis[(1-phenylethyl)phenyl] phosphate, phenylbis[(1-methyl-1-phenylethyl)phenyl] phosphate and phenyl bis[4-(1-phenylethyl)-2,6-dimethylphenyl] phosphate are also suitable.

Resorcinol diphosphate, higher oligomers of resorcinol diphosphate, hydroquinone diphosphate and its oligomers may also be mentioned as examples of suitable halogen-free phosphorus compounds.

Component F

The novel thermoplastic molding materials may contain, as component F, from 0 to 50, in particular from 0.05 to 45%, by weight of fibrous or particulate fillers or mixtures thereof. These are preferably commercially available products. Processing assistants and stabilizers, such as UV stabilizers, lubricants, phosphorus stabilizers and antistatic agents, are usually used in amounts of from 0.01 to 5% by weight, whereas reinforcing agents, such as carbon fibers or glass fibers, are employed in amounts of from 5 to 40% by weight.

Carbon fibers and especially glass fibers are particularly preferred as component F.

The glass fibers used may comprise E, A or C glass and are preferably treated with a size and an adhesion promoter. Their diameter is in general from 6 to 20 µm. Both rovings and chopped glass fibers having a length of from 1 to 10 mm, preferably from 3 to 6 mm, may be used.

Furthermore, fillers or reinforcing materials, such as glass beads, mineral fibers, whiskers, alumina fibers, mica, quartz powder and wollastonite, may be added.

Metal flakes (e.g. aluminum flakes from Transmet Corp.), metal powders, metal fibers, metal-coated fillers (e.g. nickel-coated glass fibers) and other additives which provide shielding from electromagnetic waves may also be mentioned. Al flakes (K 102 from Transmet) are particularly suitable for EMI (electromagnetic interference) purposes, as well as mixtures of this material with additional carbon fibers, conductivity carbon black or nickel-coated carbon fibers.

The novel molding materials may also contain further additives which are typical and conventionally used for polycarbonates, SAN polymers and graft copolymers based on ASA or ABS or blends thereof. Examples of such additives are dyes, pigments, antistatic agents, antioxidants and in particular lubricants, which are required for the further processing of the molding material, for example in the production of moldings or shaped articles. Typical additives include antidrop agents, a particular example of which is teflon, which is preferably used dispersed in water.

The preparation of the novel thermoplastic molding materials is carried out by mixing components. It may be advantageous to pre-mix individual components. Mixing of the components in solution and removal of the solvents is also possible.

Suitable organic solvents for components A to E and the soluble additives of group F are, for example, chlorobenzene, mixtures of chlorobenzene and methylene chloride or mixtures of chlorobenzene and aromatic hydrocarbons, eg. toluene.

Evaporation of the solvent mixtures can be effected, for example, in devolatilization extruders.

Mixing of components A, B, C, D, E and, if required, F, which are, for example, dry, can be carried out by all known methods. Preferably, however, mixing of components A, B, C, D, E and, if required, F is carried out at from 200 to 320° C. by extruding, kneading or roll-milling the components together, the components necessarily having been isolated beforehand from the solution obtained in the polymerization or from the aqueous dispersion.

Examples of mixing units are conventional tumbling mixers or stirred mixers.

Suitable units for melt compounding are, for example, heated batchwise internal kneaders with or without a floating weight, continuous internal kneaders, screw-type kneaders having axially oscillating screws, twin-screw extruders and roll mills having heated rolls.

For example, single-screw or twin-screw extruders are particularly suitable for melt extrusion.

The novel thermoplastic molding materials may also be processed by the known methods for processing thermoplastics, for example by extrusion, injection molding, calandering, blow molding, compression molding or sintering.

The novel molding materials may be processed by thermoplastic methods. They possess good notched impact strengths at low temperatures. Moreover, they tend to crack only under high impacts. The novel molding materials also have sufficient flowability to ensure short cycle times in the production of shaped articles. In particular, the novel molding materials are flame-retardant.

EXAMPLES

Testing of Performance Characteristics

The weight average particle sizes ($d_{50}$) were determined by means of an analytical ultracentrifuge according to the method described in W. Scholtan, H. Lange, Kolloid-Z. und Z.-Polymere 250 (1972) 782–796.

The ultracentrifuge measurement gives the integral mass distribution of the particle diameter of a sample. From this it is possible to determine the percentage by weight of the particles which have a diameter equal to or smaller than a certain size. The average particle diameter, which is also referred to as $d_{50}$ value of the integral mass distribution, is defined as the value at which 50% by weight of the particles have a smaller diameter, and 50% by weight of the particles have a larger diameter, than the $d_{50}$ value. In order to characterize the width of the particle size distribution of the rubber particles, the $d_{10}$ and $d_{90}$ values obtained from the integral mass distribution are used in addition to the $d_{50}$ value (average particle diameter). The $d_{10}$ and $d_{90}$ values of the integral mass distribution are defined similarly to the $d_{50}$ value, except that they are based on 10 and 90% by weight, respectively, of the particles. The quotient $Q=(d_{90}-d_{10})/d_{50}$ is a measure of the width of the particle size distribution.

The test specimens were prepared at a mass temperature of 260° C. and a tool temperature of 80° C.

A measure of the resistance to cracking under impact is the damaging energy $W_D$. To determine this, circular discs (60–2 mm) were subjected to the penetration test according to DIN 53 443. These impact tests were carried out at 23° C.

The heat distortion resistance of the samples was determined by means of the Vicat softening temperature. The Vicat softening temperature was determined according to DIN 53 460, using a force of 49.05 N and a temperature increase of 50 K per hour, on standard small bars.

The flowability of the molding materials was determined according to DIN 53 735 at 260° C. and 5 kg load.

The notched impact strengths ($a_k$[kJ/m$^2$]) were measured at the stated temperatures according to ISO 179/1eA on ISO bars injection molded and then milled (A notch).

The impact strengths ($a_n$[kJ/m$^2$]) were measured according to ISO 179/1eU at –40° C. on injection molded standard small bars. The mean value from the testing of 10 samples per sample series is stated in each case.

The flame retardance was tested in the vertical fire test according to the methods of Underwriter Laboratories (UL 94). The test was carried out in each case on 5 samples measuring 127 mm×12.7 mm×1.7 mm. Each test specimen was exposed twice to an open flame, and the subsequent combustion time for each flame application was measured for all samples. The sum of the subsequent combustion times of these 10 flame applications in total was defined as the total combustion time ($t_{tot}$).

The following components were used:

A1:

A commercial polycarbonate based on bisphenol A and having a relative solution viscosity $\eta_{rel}$=1.3 ml/g (viscosity number VZ=61 ml/g), measured in a 0.5% strength by weight solution in dichloromethane at 23° C.

A2:

Recycled polycarbonate from sheet extrusion, obtained by milling edge trimmings and subsequent granulation and characterized by a relative solution viscosity $\eta_{rel}$=1.31 ml/g (VZ=62.5 ml/g), measured in a 0.5% strength by weight solution in dichloromethane at 23° C.

B1:

A finely divided graft copolymer prepared from:

$\beta_1$) 16 g of n-butyl acrylate and 0.4 g of tricyclodecenyl acrylate, which were heated to 60° C. while stirring in 150 g of water with the addition of 1 g of sodium salt of a $C_{12}$–$C_{18}$-paraffinsulfonic acid, 0.3 g of potassium persulfate, 0.3 g of sodium bicarbonate and 0.15 g of sodium pyrophosphate. After initiation of the polymerization reaction, a mixture of 82 g of n-butyl acrylate and 1.6 g of tricyclodecenyl acrylate was added in the course of 3 hours. After the end of the monomer addition, stirring was continued for a further hour. The resulting latex of the crosslinked butyl acrylate polymer had a solids content of 40% by weight, the average particle size ($d_{50}$-value) was determined at 76 nm and the particle size distribution was narrow (quotient Q=0.29).

$\beta_2$) 150 g of the polybutyl acrylate latex obtained in $\beta_1$) were mixed with 40 g of a mixture of styrene and acrylonitrile (mass ratio 75:25) and 60 g of water and, after the addition of a further 0.03 g of potassium persulfate and 0.05 g of lauroyl peroxide, the stirred mixture was heated at 65° C. for 4 hours. After the end of the graft copolymerization, the polymerization product was precipitated from the dispersion by means of calcium chloride solution at 95° C., washed with water and dried in a warm air stream. The degree of grafting of the graft copolymer was 35% and the average particle size ($d_{50}$ value) was 91 nm.

B2:

A coarse-particle graft copolymer prepared from:

$\beta_3$) 50 g of water and 0.1 g of potassium persulfate and then, in the course of 3 hours, a mixture of 49 g of n-butyl acrylate and 1 g of tricyclodecenyl acrylate on the one hand and a solution of 0.5 g of sodium salt of $C_{12}$–$C_{18}$-paraffinsulfonic acid in 25 g of water on the other hand were added at 60° C. to an initially taken mixture of 1.5 g of the latex prepared in $\beta_1$). Polymerization was then continued for 2 hours. The resulting latex of the crosslinked butyl acrylate polymer had a solids content of 40%. The average particle size ($d_{50}$ value) was determined as 430 nm and the particle size distribution was narrow (Q=0.1).

$\beta_4$) 150 g of the latex prepared in $\beta_3$) were mixed with 20 g of styrene and 60 g of water and, after the addition of a further 0.03 g of potassium persulfate and 0.05 g of lauroyl peroxide, the stirred mixture was heated at 65° C. for 3 hours. The dispersion obtained in this graft copolymerization was then polymerized with 20 g of a mixture of styrene and acrylonitrile in a weight ratio of 75:25 for a further 4 hours. The reaction product was then precipitated from the dispersion by means of a calcium chloride solution at 95° C., separated off, washed with water and dried in a warm air stream. The degree of drafting of the graft copolymer was determined as 35%; the average size of the latex particles ($d_{50}$ value) was 510 nm.

B3:

Graft copolymer based on polybutadiene

A graft copolymer prepared by polymerization of 60 g of butadiene in the presence of a solution of 0.6 g of tert-dodecylmercaptan, 0.7 g of sodium $C_{14}$-alkanesulfonate as an emulsifier, 0.2 g of potassium peroxodisulfate and 0.2 g of sodium pyrophosphate in 80 g of water at 65° C. At the end of the reaction, the pressure in the polymerization autoclave was let down. The conversion was 98%.

A polybutadiene latex whose average particle size was 100 nm was obtained. This was agglomerated with a solids content of 10 parts by weight by adding 25 g of an emulsion of a copolymer of 96 g of ethyl acrylate and 4 g of methacrylamide, a polybutadiene latex having an average particle size of 350 nm being formed. After the addition of 40 g of water, 0.4 g of a sodium $C_{14}$-alkanesulfonate and 0.2 part of potassium peroxodisulfate, 40 g of a mixture of styrene and acrylonitrile in a weight ratio of 70:30 were added in the course of 4 hours. The polymerization was carried out with stirring of the batch at 75° C. The conversion based on styrene/acrylonitrile was virtually quantitative. The graft rubber dispersion obtained was precipitated by means of calcium chloride solution and the graft copolymer isolated was washed with distilled water.

C1:

A copolymer of styrene and acrylonitrile in a weight ratio of 75:25, having a viscosity number of 82 ml/g (measured in a 0.5% strength by weight solution in dimethylformamide at 23° C.), prepared by continuous solution polymerization by a method as described, for example, in Kunststoff-Handbuch, Vieweg-Daumiller, Volume V (Polystyrol), Carl-Hanser-Verlag, Munich 1969, Page 124, line 12 et seq.

C2:

A copolymer of styrene and acrylonitrile in a weight ratio of 80:20, having a viscosity number of 83 ml/g (measured in a 0.5% strength by weight solution in dimethylformamide at 23° C.), prepared by continuous solution polymerization by a method as described, for example, in Kunststoff-Handbuch, Vieweg-Daumiller, Volume V (Polystyrol), Carl-Hanser-Verlag, Munich 1969, Page 124, line 12 et seq.

D1:

A condensate of bisphenol A and epichlorohydrin having a relative viscosity of 1.13, measured in a 0.5% strength by weight solution in $CH_2Cl_2$ at 25° C. (e.g. Phenoxy® from Union Carbide).

E1:

Triphenyl phosphate

E2:

Resorcinol diphenyl phosphate

F1:

A high molecular weight of fatty acid based multicomponent ester having a viscosity of from 110 to 150 mPa·s (at 80° C.) as a lubricant (e.g. Loxiol® G 70 S from Henkel).

Preparation of the molding materials

The components A to F were mixed in a twin-screw extruder (ZSK 30 from Werner & Pfleiderer) at from 250 to 280° C., extruded, cooled and granulated.

The dried granules were converted at from 250 to 280° C. into circular discs, standard small bars, ISO test specimens and flat bars for the UL-94 test.

The compositions and properties of the molding materials are shown in the tables.

TABLE 1

Molding materials which contain a polycarbonate and a finely divided graft copolymer

| Molding material No. | C1 | 1 | 2 |
|---|---|---|---|
| Component [% by weight] | | | |
| A1 | 64.3 | 63.6 | 62.1 |
| B1 | 8 | 7.9 | 7.7 |
| C1 | 16 | 15.8 | 15.5 |
| D1 | — | 1 | 3 |
| E1 | 11 | 11 | 11 |
| F1 | 0.3 | 0.3 | 0.3 |
| F2 | 0.4 | 0.4 | 0.4 |
| Properties | | | |
| $a_k$ [kJ/m$^2$] | 11 | 13 | 13 |
| $a_n$ (−40° C.) [kJ/m$^2$] | 274 | 310 | 334 |
| $W_D$ [Nm] | 42 | 45 | 46 |
| MVI [ml/10'] | 39 | 43 | 45 |
| $t_{tot}$ [s] | 46 | 39 | 31 |

C: Comparative experiment

TABLE 2

Molding materials which contain a polycarbonate and a graft copolymer having different particle sizes

| Molding material No. | C2 | 3 | 4 | C3 | 5 | C4 | 6 | 7 | C5 | 8 |
|---|---|---|---|---|---|---|---|---|---|---|
| Component [% by weight] | | | | | | | | | | |
| A1 | 60 | 59.4 | 58.2 | 64.3 | 62.1 | 75.3 | 75.3 | 75.3 | 75.3 | 72.9 |
| B1 | 10 | 9.9 | 9.7 | 4 | 3.85 | 4.4 | 4.4 | 4.4 | 4 | 3.9 |
| B2 | 10 | 9.9 | 9.7 | 4 | 3.85 | 4.4 | 4.4 | 4.4 | 4 | 3.9 |
| C1 | 19.5 | 19.3 | 18.9 | 16 | 15.5 | 4.4 | 3.4 | 3 | 10 | 9.6 |
| D1 | — | 1 | 3 | — | 3 | — | 1 | 3 | — | 3 |
| E1 | — | — | — | — | — | 10.9 | 10.9 | 10.9 | — | — |
| E2 | — | — | — | 11 | 11 | — | — | — | 6 | 6 |
| F1 | 0.5 | 0.5 | 0.5 | 0.3 | 0.3 | 0.24 | 0.24 | 0.24 | 0.3 | 0.3 |
| F2 | — | — | — | 0.4 | 0.4 | 0.36 | 0.36 | 0.36 | 0.4 | 0.4 |
| Properties | | | | | | | | | | |
| $a_k$ [kJ/m$^2$] | 30 | 31 | 31 | 10 | 12 | 8.2 | 9.7 | 8.9 | 39 | 41 |

TABLE 2-continued

Molding materials which contain a polycarbonate and a graft copolymer having different particle sizes

| Molding material No. | C2 | 3 | 4 | C3 | 5 | C4 | 6 | 7 | C5 | 8 |
|---|---|---|---|---|---|---|---|---|---|---|
| $a_n$ (−40° C.) [kJ/m$^2$] | 280 | 294 | 305 | 275 | 300 | 295 | 310 | 315 | 280 | 310 |
| Vicat B [° C.] | 115 | 118 | 122 | n.m. | n.m. | 93 | 96 | 98 | n.m. | n.m. |
| $W_D$ [Nm] | 57 | 56 | 59 | 39 | 45 | 47 | 45 | 46 | 43 | 45 |
| MVI [ml/10'] | 13 | 13 | 12.2 | 41 | 47 | 47 | 47 | 46 | 22 | 25 |
| $t_{tot}$ [s] | n.m. | n.m. | n.m. | 56 | 35 | n.m. | n.m. | n.m. | 111 | 67 |

C: Comparative experiment.
n.m.: not measured

TABLE 3

Molding materials which contain a polycarbonate and a graft copolymer B3

| Molding material No. | C6 | 9 | C7 | 10 | 11 |
|---|---|---|---|---|---|
| Component [% by weight] | | | | | |
| A1 | 65 | 65 | 64.8 | 64.0 | 61.9 |
| B3 | 17.5 | 17.5 | 8 | 7.9 | 7.6 |
| C1 | 17 | 14 | 14 | 13.9 | 13.3 |
| D1 | — | 3 | — | 1 | 4 |
| E1 | — | — | — | — | — |
| E2 | — | — | 12.5 | 12.5 | 12.5 |
| F1 | 0.5 | 0.5 | 0.3 | 0.3 | 0.3 |
| F2 | — | — | 0.4 | 0.4 | 0.4 |
| Properties | | | | | |
| $a_k$ [kJ/m$^2$] | 34 | 33 | 15 | 18 | 19 |
| $W_D$ [Nm] | 56 | 55 | 43 | 45 | 45 |
| Vicat B [° C.] | 116 | 120 | n.m. | n.m. | n.m. |
| MVI [ml/10'] | 11.0 | 11.2 | 34 | 36 | 40 |
| $t_{tot}$ [s] | n.m. | n.m. | 110 | 90 | 69 |

C: Comparative experiment

TABLE 4

Molding materials which contain a carbonate from extrusion

| Molding material No. | C8 | 12 |
|---|---|---|
| Component [% by weight] | | |
| A1 | 48 | 48 |
| A2 | 12 | 11.4 |
| B1 | 10 | 9.9 |
| B2 | 10 | 9.9 |
| C1 | 19.5 | 19.3 |
| D1 | — | 1 |
| F1 | 0.5 | 0.5 |
| Properties | | |
| $a_k$ [kJ/m$^2$] | 59 | 62 |
| $a_n$ (−40° C.) [kJ/m$^2$] | 295 | 311 |
| $W_D$ [Nm] | 65 | 61 |
| Vicat B [° C.] | 120 | 121 |
| MVI [ml/10'] | 11 | 12 |

C: Comparative experiment

We claim:

1. A molding material consisting of
A) from 5 to 97.9% by weight of at least one polycarbonate having a weight average molecular weight ($M_w$) of from 10,000 to 64,000 g/mol,
B) from 1 to 93.9% by weight of at least one graft copolymer,
C) from 1 to 93.9% by weight of at least one copolymer of
   $c_1$) at least one vinylaromatic compound of the formula I

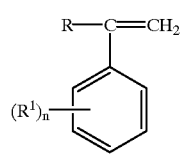

where R is hydrogen or $C_1$–$C_8$-alkyl, $R^1$ is $C_1$–$C_8$-alkyl and n is an integer from 0 to 3, or of a $C_1$–$C_8$-alkyl acrylate, a $C_1$–$C_8$-alkyl $C_1$–$C_8$-alkylacrylate or a mixture thereof and
   $c_2$) acrylonitrile, $C_1$–$C_8$-alkylacrylonitrile or a mixture thereof,
D) from 0.01 to 20% by weight of at least one condensate of at least one diol selected from the group consisting of 1,2-propanediol, 1,3-propanediol, 1,4-butanediol, 2,4-pentanediol, 1,5-pentanediol, 1,2-hexanediol, 1,5-hexanediol, 1,6-hexanediol, 2,2-di(4-hydroxyphenyl) propane and di-4,4'-hydroxyphenyl sulfone with epihalohydrin,
E) from 2 to 25% by weight of at least one halogen-free phosphorus compound and
F) from 0 to 50% by weight of a reinforcing agent or an additive selected from the group consisting of dyes, pigments, antistatic agents, antioxidants, lubricants and antidrop agents or mixtures thereof, or a reinforcing agent and an additive selected from the group consisting of dyes, pigments, antistatic agents, antioxidants, lubricants and antidrop agents or mixtures thereof.

2. The molding material defined in claim 1, wherein the component A is a mixture of
$a_1$) from 0 to 95% by weight of at least one polycarbonate having a weight average molecular weight ($M_w$) of from 10,000 to 60,000 g/mol and
$a_2$) from 5 to 100% by weight of at least one polycarbonate having a weight average molecular weight ($M_w$) of from 10,000 to 60,000 g/mol from extrusion wastes.

3. The molding material defined in claim 1, wherein the component B is at least one graft copolymer consisting of
$b_1$) from 40 to 80% by weight of a grafting base comprising an elastomeric polymer having a glass transition temperature of less than 10° C. and
$b_2$) from 20 to 60% by weight of a graft comprising
  $b_{21}$) from 50 to 95% by weight of a vinyl aromatic compound of the formula I, a $C_1$–$C_8$-alkyl acrylate or a $C_1$–$C_8$-alkyl $C_1$–$C_8$-alkylacrylate or a mixture thereof and
  $b_{22}$) from 5 to 50% by weight of acrylonitrile, a $C_1$–$C_8$-alkylacrylonitrile or a mixture thereof.

4. The molding material defined in claim 1, wherein the component D is a polycondensate of 2,2-di(4-hydroxyphenyl)propane and epichlorohydrin.

5. The molding material defined in claim 1, wherein component E is triphenylphosphate, resorcinol diphosphate or hydroquinone diphosphate.

6. The molding material defined in claim 1, consisting of
from 7.5 to 94.9% by weight of component A,
from 2.5 to 89.9% by weight of component B,
from 2.5 to 89.9% by weight of component C,
from 0.1 to 0.9% by weight of component D,
from 2 to 20% by weight of component E and
from 0 to 40% by weight of component F.

7. A molding, film or fiber containing a molding material as defined in claim 1.

8. The molding material defined in claim 1, wherein the additive is present in an amount of from 0.01 to 5% by weight.

9. The molding material defined in claim 8, comprising a high molecular weight fatty acid based multicomponent ester having a viscosity of from 110 to 150 mPa·s (at 80° C.) as a lubricant.

10. The molding material defined in claim 1 comprising 0.01 to 4% by weight of component D.

11. The molding material defined in claim 1, wherein the halogen-free phosphorus compound of component E has the formula IV

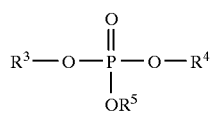
(IV)

where $R^3$, $R^4$ and $R^5$, independently of one another, are halogen-free $C_1$–$C_8$-alkyl or halogen-free $C_6$–$C_{20}$-aryl, which is unsubstituted or mono- or disubstituted by $C_1$–$C_4$-alkyl.

12. The molding material defined in claim 1, wherein component D has a weight average molecular weight ($M_w$) of from 10,000 to 150,000 g/mol.

13. The molding material defined in claim 1, wherein the component B is at least one graft copolymer consisting of $b_1$) from 40 to 80% by weight of a grafting base comprising an elastomeric polymer having a glass transition temperature of less than 10° C. and $b_2$) from 20 to 60% by weight of a graft comprising $b_{21}$) from 50 to 95% by weight of a vinyl aromatic compound of the formula I, a $C_1$–$C_8$-alkyl acrylate or a mixture thereof and $b_{22}$) from 5 to 50% by weight of acrylonitrile, a $C_1$–$C_8$-alkylacrylonitrile or a $C_1$–$C_8$-alkyl $C_1$–$C_8$-alkylacrylate or a mixture thereof.

14. The molding material defined in claim 1, wherein the component B is at least one graft copolymer consisting of $b_1$) from 40 to 80% by weight of a grafting base comprising an elastomeric polymer having a glass transition temperature of less than 10° C. and $b_2$) from 20 to 60% by weight of a graft comprising $C_1$–$C_8$alkyl $C_1$–$C_8$-alkylacrylate.

15. The molding material defined in claim 1, wherein the reinforcing agent is present in an amount of from 5 to 40% by weight.

* * * * *